(12) United States Patent
Ramos et al.

(10) Patent No.: US 11,055,946 B2
(45) Date of Patent: Jul. 6, 2021

(54) NETWORK MANAGED RULES FOR MACHINE ACCESS

(71) Applicant: INTERNATIONAL BUSINESS MACHINES CORPORATION, Armonk, NY (US)

(72) Inventors: Igor S. Ramos, Round Rock, TX (US); Andrew J. Lavery, Austin, TX (US); Leucir Marin, Jr., Cedar Park, TX (US); Faheem Altaf, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/582,935

(22) Filed: Sep. 25, 2019

(65) Prior Publication Data

US 2021/0090363 A1     Mar. 25, 2021

(51) Int. Cl.
*G07C 9/38* (2020.01)
*G06Q 50/08* (2012.01)
(Continued)

(52) U.S. Cl.
CPC ............... *G07C 9/38* (2020.01); *G06F 21/42* (2013.01); *G06N 20/00* (2019.01); *G06Q 10/06* (2013.01);
(Continued)

(58) Field of Classification Search
CPC ............... G06Q 30/0645; G06Q 10/06; G06Q 10/0637; G06Q 50/08; G06Q 50/00;
(Continued)

(56) References Cited

U.S. PATENT DOCUMENTS

| | | | |
|---|---|---|---|
| 6,553,336 B1 * | 4/2003 | Johnson | G08B 25/08 702/188 |
| 6,892,131 B2 * | 5/2005 | Coffee | B28C 5/422 280/6.151 |

(Continued)

OTHER PUBLICATIONS

P. Mell, et al., "Effectively and Securely Using the Cloud Computing Paradigm", NIST, Information Technology Laboratory, Oct. 7, 2009, pp. 80.

(Continued)

*Primary Examiner* — Brian E Miller
(74) *Attorney, Agent, or Firm* — Konrad Raynes Davda & Victor LLP; Janaki K. Davda

(57) ABSTRACT

Provided are techniques for network managed rules for machine access. A request to access a machine is received from an operator. One or more machine access rules are identified for a machine and an operator who will operate the machine for a company in a location, where each of the one or more machine access rules includes variable criteria. Data for the variable criteria of the one or more machine access rules is obtained from one or more of: a machine profile of the machine, an operator profile of the operator, a company profile of the company, and environmental data for the location. The data is applied to the variable criteria of the one or more machine access rules to determine whether to provide the operator with access to the machine at the location. An indication of whether the operator has access to the machine at the location is determined.

18 Claims, 9 Drawing Sheets

(51) Int. Cl.
*G06Q 30/06* (2012.01)
*G06F 21/42* (2013.01)
*G06N 20/00* (2019.01)
*G06Q 10/06* (2012.01)

(52) U.S. Cl.
CPC ......... *G06Q 50/08* (2013.01); *G06Q 10/0637* (2013.01); *G06Q 30/0645* (2013.01)

(58) Field of Classification Search
CPC ......... G06Q 10/00; G06F 21/60; G06F 21/42; Y02P 90/86; Y02P 90/80; G07C 9/38; G06N 20/00
See application file for complete search history.

(56) References Cited

U.S. PATENT DOCUMENTS

| | | | |
|---|---|---|---|
| 7,812,712 B2 | 10/2010 | White et al. | |
| 7,899,610 B2 | 3/2011 | McClellan | |
| 8,018,329 B2 | 9/2011 | Morgan et al. | |
| 8,965,841 B2* | 2/2015 | Wallace | G06Q 30/0645 707/609 |
| 9,235,938 B2* | 1/2016 | Sixt, Jr. | G07C 3/00 |
| 9,493,149 B2 | 11/2016 | Phelan | |
| 9,519,876 B2* | 12/2016 | Wallace | G06Q 10/06 |
| 9,633,237 B2* | 4/2017 | Heine | G06Q 10/087 |
| 10,065,658 B2 | 9/2018 | Deligianni et al. | |
| 2003/0055666 A1* | 3/2003 | Roddy | G06Q 10/06395 705/305 |
| 2004/0073468 A1* | 4/2004 | Vyas | G06Q 10/0639 705/7.13 |
| 2005/0143956 A1* | 6/2005 | Long | F04D 15/0088 702/184 |
| 2005/0249333 A1* | 11/2005 | Baker | G01D 9/005 379/32.01 |
| 2006/0026017 A1* | 2/2006 | Walker | H04L 63/302 701/31.4 |
| 2006/0276185 A1* | 12/2006 | Ram | G07C 5/008 455/420 |
| 2007/0158128 A1 | 7/2007 | Gratz et al. | |
| 2007/0200664 A1* | 8/2007 | Proska | G08G 1/205 340/5.42 |
| 2008/0059080 A1* | 3/2008 | Greiner | H04L 43/16 702/33 |
| 2008/0059411 A1* | 3/2008 | Greiner | G06Q 10/06 |
| 2010/0004818 A1 | 1/2010 | Phelan | |
| 2010/0311385 A1* | 12/2010 | Hurwitz | H04L 67/26 455/404.1 |
| 2014/0324740 A1* | 10/2014 | Garera | G06N 5/022 706/12 |
| 2016/0214571 A1 | 7/2016 | Othmer et al. | |
| 2018/0270244 A1 | 9/2018 | Kumar et al. | |
| 2018/0375868 A1* | 12/2018 | Ticas | A47G 27/0231 |
| 2019/0043283 A1* | 2/2019 | Hyde | A61B 5/681 |
| 2019/0304204 A1* | 10/2019 | Gao | G06Q 50/30 |
| 2019/0333170 A1* | 10/2019 | Moda | G06Q 10/063116 |
| 2020/0051037 A1* | 2/2020 | Liu | G06Q 30/0645 |

OTHER PUBLICATIONS

P. Mell, et al., "The NIST Definition of Cloud Computing", NIST, US Department of Commerce, Special Publication 800-145, Sep. 2011, pp. 7.

G. Maria, et al., "6 Outstanding Geofencing Tools to Use on Your Construction Site", Capterra, dated Dec. 1, 2016, [online, retrieved Sep. 11, 2019, https://blog.capterra.com/6-outstanding-geofencing-tools-to-use-on-your-construction-site/], pp. 18.

"Interlock (engineering)", Wikipedia, [online, retrieved Sep. 2019, https://en.wikipedia.org/wiki/Interlock_(engineering)], pp. 4.

* cited by examiner

NETWORK MANAGED RULES FOR MACHINE ACCESS

BACKGROUND

1. Field of the Invention

Embodiments of the invention relate to network managed rules for machine access.

2. Description of the Related Art

Machine operation (e.g., operation of a construction vehicle in a worksite) should be restricted based on several factors, ranging from the machine having up-to-date inspection records to the operator being properly trained and certified to operate that machine.

However, the management of those factors is complex and involves many disconnected processes, often performed by different parties. This often results in machine operation, while the machine is defective or the operator is untrained. The issue with such "out-of-spec" operations often translate to financial liability and impact both the machine owner and the worksite owner.

It is possible that the machine owner may be liable for safety regulation infringement for letting an operator without proper certification operate the machine. Also, machine operation, when the machine is not calibrated or is defective, may result in warranty claims from the worksite owner against the contractor because such machine may result in poor work execution. For example, for road construction, a heavy machine has to be used in a precise manner to establish a good foundation for a road with a significant grade in a mountainous area. If the machine is not used by an appropriately skilled and licensed operator, the road foundation may either (a) immediately illustrate defects (fast deterioration) by beginning to slide down the mountain, or (b) initially look ok, but upon use, the road foundation deteriorates because it was not created in a skilled manner, and the foundation is not structurally sound.

SUMMARY

In accordance with embodiments, a computer-implemented method is provided for network managed rules for machine access. The computer-implemented method comprises operations. A request to access a machine is received from an operator. One or more machine access rules are identified for a machine and an operator who will operate the machine for a company in a location, where each of the one or more machine access rules includes variable criteria. Data for the variable criteria of the one or more machine access rules is obtained from one or more of: a machine profile of the machine, an operator profile of the operator, a company profile of the company, and environmental data for the location. The data is applied to the variable criteria of the one or more machine access rules to determine whether to provide the operator with access to the machine at the location. An indication of whether the operator has access to the machine at the location is determined.

In accordance with other embodiments, a computer program product is provided for network managed rules for machine access. The computer program product comprises a computer readable storage medium having program code embodied therewith, the program code executable by at least one processor to perform operations. A request to access a machine is received from an operator. One or more machine access rules are identified for a machine and an operator who will operate the machine for a company in a location, where each of the one or more machine access rules includes variable criteria. Data for the variable criteria of the one or more machine access rules is obtained from one or more of: a machine profile of the machine, an operator profile of the operator, a company profile of the company, and environmental data for the location. The data is applied to the variable criteria of the one or more machine access rules to determine whether to provide the operator with access to the machine at the location. An indication of whether the operator has access to the machine at the location is determined.

In yet other embodiments, a computer system is provided for network managed rules for machine access. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A request to access a machine is received from an operator. One or more machine access rules are identified for a machine and an operator who will operate the machine for a company in a location, where each of the one or more machine access rules includes variable criteria. Data for the variable criteria of the one or more machine access rules is obtained from one or more of: a machine profile of the machine, an operator profile of the operator, a company profile of the company, and environmental data for the location. The data is applied to the variable criteria of the one or more machine access rules to determine whether to provide the operator with access to the machine at the location. An indication of whether the operator has access to the machine at the location is determined.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Merely to enhance understanding of embodiments, examples are provided herein.

Embodiments determine whether to grant (provide) access to a machine based on one or more machine access rules for one or more functions of the machine. Certain embodiments provide network managed rules for machine interlock, where interlock may be described as a feature that makes the state of two functions of the machine mutually dependent.

Figure 1:
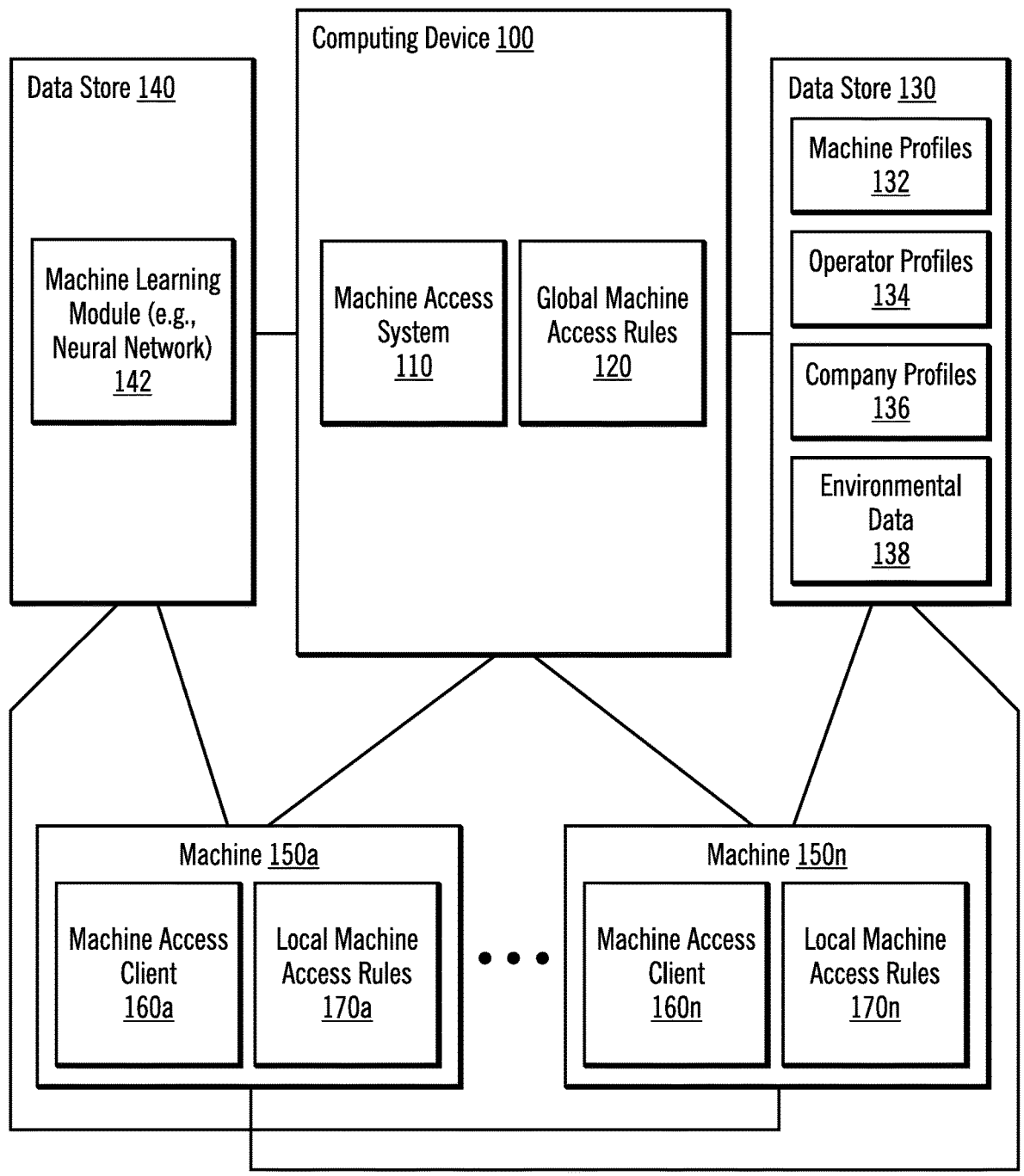
FIG. 1 illustrates, in a block diagram, a computing environment in accordance with certain embodiments.

FIG. 1 illustrates, in a block diagram, a computing environment in accordance with certain embodiments. A computing device 100 is connected to machines 150a . . . 150n. The computing device 100 includes a machine access system 110 and global machine access rules 120 for the different machines 150a . . . 150. Each machine 150a . . . 150n includes a machine access client 160a . . . 160n and local machine access rules 170a . . . 170n for that machine 150a . . . 150n. Thus, while the computing device 100 has global machine access rules 120 that include access rules for each machine 150a . . . 150n, the machine 150a includes local machine access rules 170a for itself, and the machine 150n includes local machine access rules 170n for itself. The global machine access rules 120 and the local machine access rules 170a . . . 170n may be described as network managed rules.

The computing device 100 is connected to a data store 130 and a data store 140. The data store 130 stores machine profiles 132 (e.g., one machine profile 132 for a particular machine (e.g., a particular cement truck)), operator profiles 134 (e.g., one operator profile 134 per operator), company profiles 136 (e.g., on company profile 136 per company), and environmental data 138. In other embodiments, any number of data stores may be connected to the computing device 100 to store any combination of the machine profiles 132, the operator profiles 134, the company profiles 136, and the environmental data 138. In certain embodiments, the data store 130 is a database. The data store 140 stores a machine learning module (e.g., a neural network) 142. The machine access system 110 may use the machine learning module 142 to determine whether to provide access.

In certain embodiments, the operator is a human operator. In other embodiments, the operator may be a robot or other machine.

In certain embodiments, when a machine 150a . . . 150n receives a request for access, the machine access client 160a . . . 160n contacts the machine access system 110 to obtain an indication of whether access to the machine 150a . . . 150n is allowed. However, in some embodiments, access to the computing device 100 may not be available. In such embodiments, when a machine 150a . . . 150n receives a request for access, the machine access client 160a . . . 160n of that machine 150a . . . 150n determines whether access is allowed to the machine 150a . . . 150n. In such embodiments, each machine 150a . . . 150n is connected to the data stores 130, 140 and is able to access the data stores 130, 140 independently of the computing device 100. In such embodiments, each machine access client 160a . . . 160n may use the machine learning module 142 to determine whether to provide access.

In certain embodiments, the computing device 100 is a cloud server containing a database of operator profiles.

In various embodiments, a machine 150a . . . 150n may be any computer (e.g., smart phone, tablet, desktop, laptop, etc.), robot, vehicle (e.g., cement truck), tool (e.g., electric screwdriver), etc.

In various embodiments, the global machine access rules 120 and the local machine access rules 170a . . . 170n, may include rules based on variable criteria, such as:

1) machine criteria (e.g., the machine has been checked according to a maintenance schedule), 2) operator criteria (e.g., experience of the operator, condition of the operator (e.g., alert rather than sleepy), etc.), 3) company criteria (e.g., a supervisor is to be with a new operator while the machine is in operation), 4) environment criteria (e.g., weather (e.g., wind, rain, etc.), grading, time of day, etc.), and 5) other criteria.

The values for the variable criteria may be obtained from the machine profiles 132, the operator profiles 134, the company profiles 136, and the environmental data 138. The machine profiles 132 identify machines and their condition. The operator profiles 134 identify operators, their permissions, and additional data (e.g., how many hours an operator has operated a particular machine). The company profiles 136 identify companies and their requirements. The environment data 138 provides information on a current environment (including location) in which a particular machine is to be operated.

In certain embodiments, the machine access system 110 or machine access client 160a . . . 160n enables an operator to obtain granular access to operation features of a machine 150a . . . 150n based on their credentials and any other required context, such as sleep, alcohol/breathalyzer results, recent hours of operation (e.g., the operator is permitted to drive an 18-wheeler ten hours per day), geofenced license applicability, etc.

In certain embodiments, geofencing describes the boundaries where the operator has license to operate the machine 150a . . . 150n. In addition, the geofence is an additional machine access rule used in combination with other machine access rules. Moreover, the geofencing coordinates may be determined by applying one or more machine access rules that may indicate where the operator may operate the machine 150a . . . 150n to where the machine 150a . . . 150n owner has permitted the machine 150a . . . 150n to be operated within a certain time frame.

In certain embodiments, the machine access system 110 or machine access client 160a . . . 160n operates if calibration or maintenance meets specified requirements (e.g., the vehicle completed an inspection within the last year) and/or thresholds (e.g., the gas tank of a vehicle holds more than a gas threshold of gas). If access is allowed to the machine 150a . . . 150n, granular control applies to the operations of the machine 150a . . . 150n.

In certain embodiments, the machine access system 110 or machine access client 160a . . . 160n enforces a company's policy of operation that further restricts what operations may be performed. For instance, a machine may be used to build a road with a severe grade if an equivalent operation has been completed in the past 6 months, otherwise, a supervisor needs to recertify the machine 150a . . . 150n.

In certain embodiments, the machine access client 160a . . . 160n tracks the operation of the machine 150*a* . . . 150*n* by an operator, and the tracked information may then be used to further certify the operator. For instance, a co-pilot of an airplane is to make 10 landings and 2,000 hours of flight supervised by a pilot before the co-pilot certification is upgraded to full pilot certification. In this example, the machine access client 160*a* . . . 160*n* of the airplane logs the hours and landings of the co-pilot.

A blockchain may be described as a growing list of records, called blocks, that are linked using cryptography. Each block contains a cryptographic hash of the previous block, a timestamp, and transaction data. In certain embodiments, blockchain provides unique ways to track operator information. For example, crane operators may be required to report into the same blockchain network and log their hours of operation. Even if an operator works for two separate companies, meeting the maximum hours of operation in a day would prevent the operator from going to a third company and working more hours than allowed by law in one day, because the shared blockchain would provide access to all of the hours of that operator.

Figure 2:
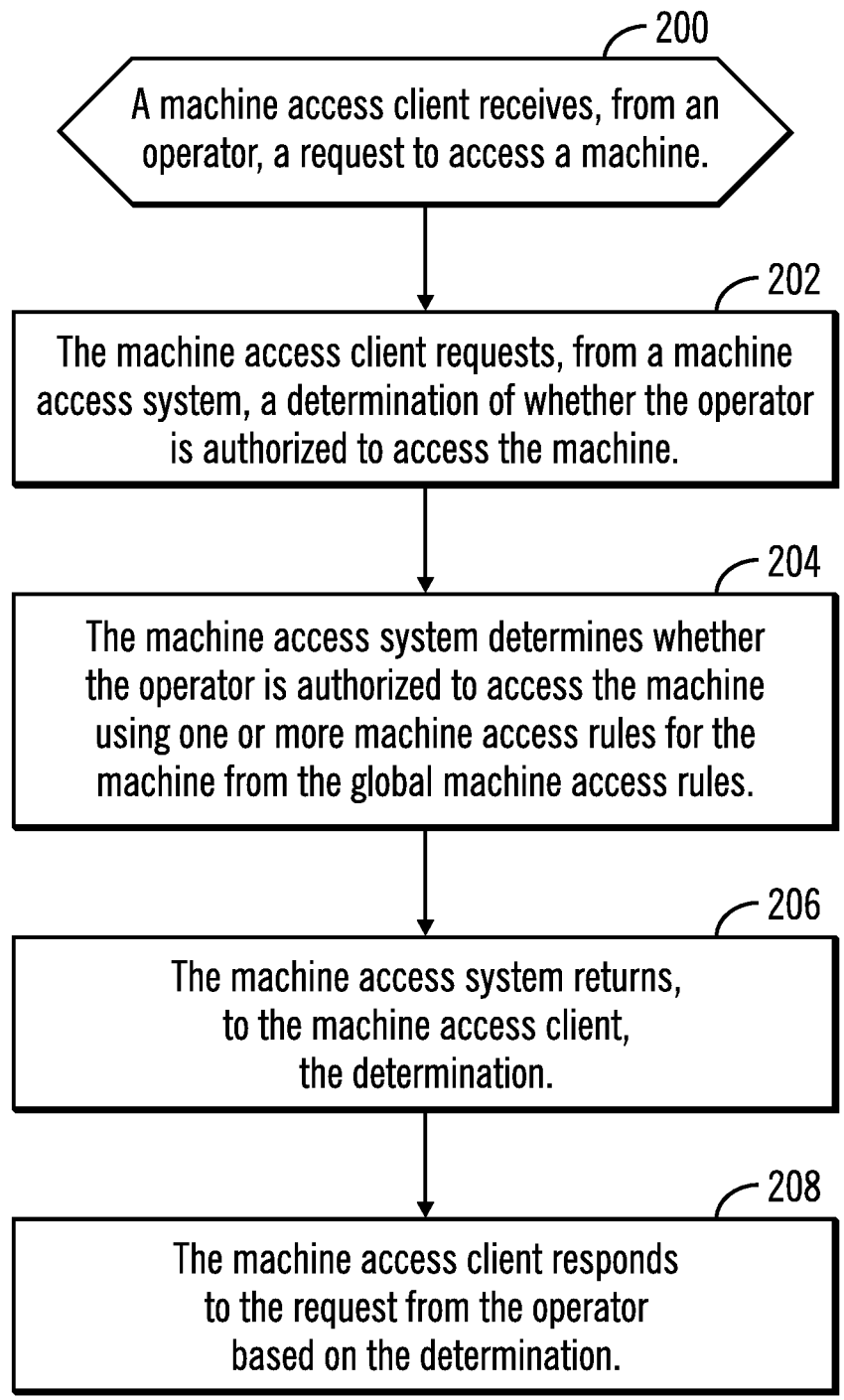
FIG. 2 illustrates, in a flow chart, operations for determining access using a machine access system in accordance with certain embodiments.

FIG. 2 illustrates, in a flow chart, operations for determining access using the machine access system 110 in accordance with certain embodiments. Control begins at block 200 with a machine access client 160*a* . . . 160*n* receiving a request, from an operator, to access a machine 150*a* . . . 150*n*. In certain embodiments, the machine belongs to a particular company ("machine owner") and is to be operated at a particular location (or "worksite", which may have a "worksite owner" different from the "machine owner") by the operator. In block 202, the machine access client 160*a* . . . 160*n* requests, from a machine access system 110, a determination of whether the operator is authorized to access the machine 150*a* . . . 150*n*. In block 204, the machine access system 110 determines whether the operator is authorized to access the machine 150*a* . . . 150*n* using one or more machine access rules for the machine 150*a* . . . 150*n* from the global machine access rules 120. In block 206, the machine access system 110 returns, to the machine access client 160*a* . . . 160*n*, the determination. In block 208, the machine access client 160*a* . . . 160*n* responds to the request from the operator based on the determination.

In particular, in blocks 206-208, based on the variable criteria of the one or more machine access rules for the machine 150*a* . . . 150*n* from the global machine access rules 120, the operator is one of: (1) denied access to the machine 160*a* . . . 160*n*, (2) granted full access to the machine 160*a* . . . 160*n* or (3) granted partial access (e.g., an intermediate level of access) to the machine 160*a* . . . 160*n* (e.g., the operator may perform a subset of functions available on the machine 160*a* . . . 160*n*, but may not perform other functions available on the machine 160*a* . . . 160*n*).

Figure 3:
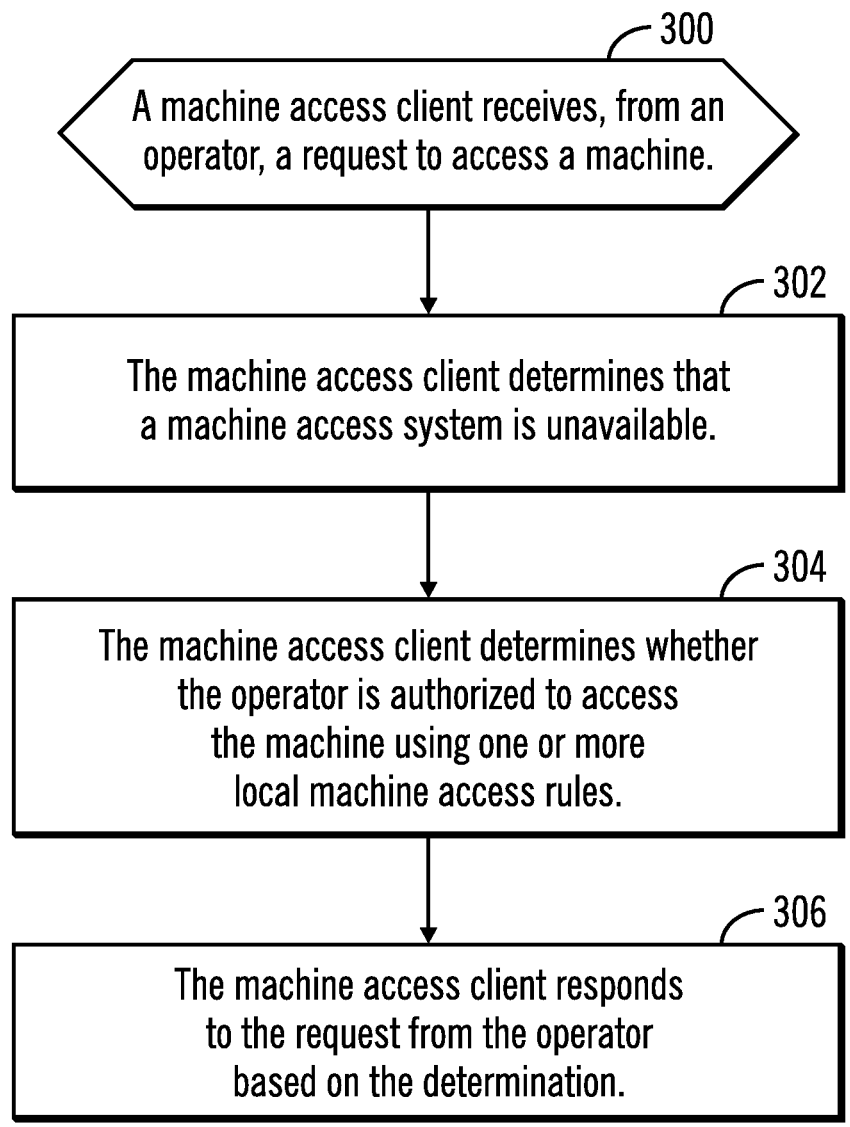
FIG. 3 illustrates, in a flow chart, operations for determining access using a machine access client in accordance with certain embodiments.

FIG. 3 illustrates, in a flow chart, operations for determining access using the machine access client 160*a* . . . 160*n* in accordance with certain embodiments. Control begins at block 300 with a machine access client 160*a* . . . 160*n* receiving a request, from an operator, to access a machine 150*a* . . . 150*n*. In certain embodiments, the machine belongs to a particular company ("machine owner") and is to be operated at a particular location (or "worksite", which may have a "worksite owner" different from the "machine owner") by the operator. In block 302, the machine access client 160*a* . . . 160*n* determines that the machine access system 110 is unavailable (e.g., because the computing device 100 is powered off, under repair, etc. or because the network connecting the computing device 100 to the machine 150*a* . . . 150*n* is unavailable). In block 304, the machine access client 160*a* . . . 160*n* determines whether the operator is authorized to access the machine 150*a* . . . 150*n* using one or more local machine access rules 170*a* . . . 170*n*. In block 306, the machine access client 160*a* . . . 160*n* responds to the request from the operator based on the determination.

In particular, in blocks 304-306, based on all of the variable criteria of the one or more local machine access rules 170*a* . . . 170*n*, the operator is one of: (1) denied access to the machine 160*a* . . . 160*n*, (2) granted access to the machine 160*a* . . . 160*n* or (3) granted an intermediate level of access to the machine 160*a* . . . 160*n* (e.g., the operator may perform a subset of functions available on the machine 160*a* . . . 160*n*, but may not perform other functions available on the machine 160*a* . . . 160*n*).

Figure 4:
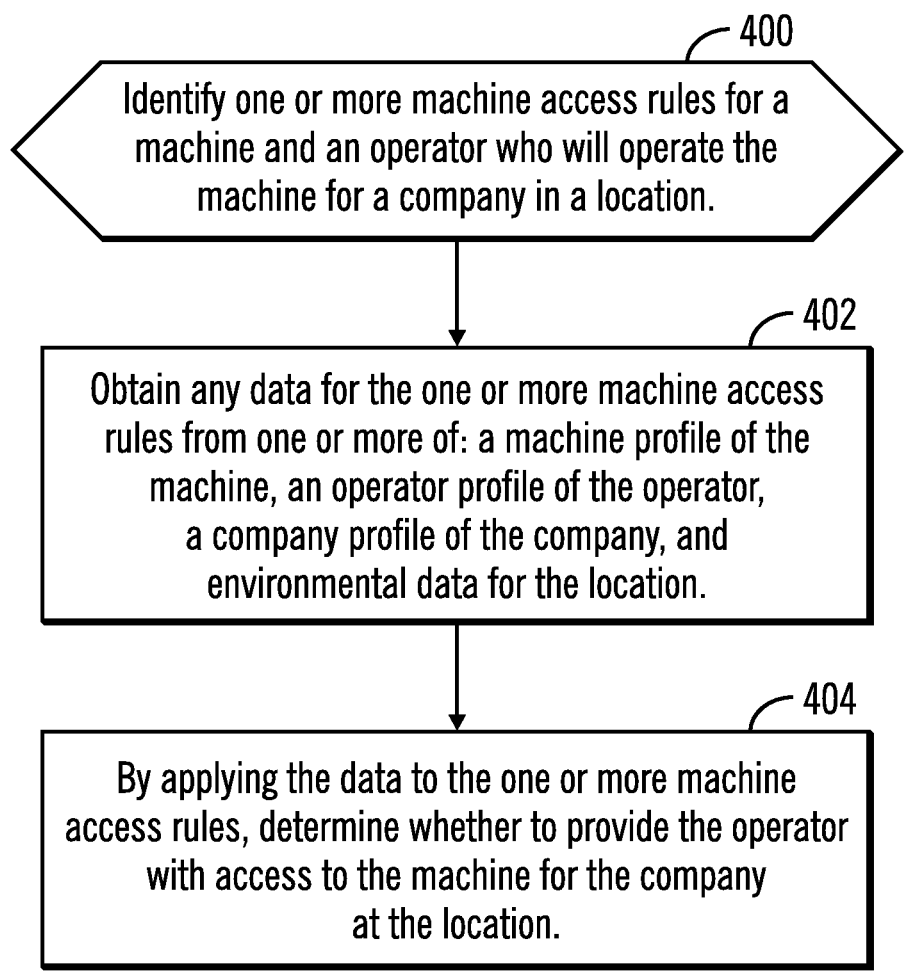
FIG. 4 illustrates, in a flow chart, operations by the machine access system or a machine access client for making a determination of access in accordance with certain embodiments.

FIG. 4 illustrates, in a flow chart, operations by the machine access system 110 or a machine access client 160*a* . . . 160*n* for making a determination of access in accordance with certain embodiments. With embodiments, either the machine access system 110 or a machine access client 160*a* . . . 160*n* performs the operations of blocks 400-404. Control begins at block 400 with one or more machine access rules from the machine access rules being identified for a machine 150*a* . . . 150*n* and an operator who will operate the machine 150*a* . . . 150*n* for a company in a location. That is, with embodiments, the identified machine access rules are for a particular machine 150*a* . . . 150*n*, a particular operator, and a particular company. In block 402, any data for the one or more machine access rules is obtained from one or more of: a machine profile 132 of the machine, an operator profile 134 of the operator, a company profile 136 of the company, and environmental data 138 for the location. The data may be used for variable criteria in the one or more machine access rules. In block 404, the data is applied to the one or more machine access rules to determine whether to provide the operator with access to the machine 150*a* . . . 150*n* for the company at the location. That is, the data is used to replace variables in the one or more machine access rules. For example, a rule may say: if operator has x hours of experience on the machine, then the operator is granted access to the machine, and the value of the variable criteria x is obtained from the data (e.g., the operator profile 134).

Figure 5:
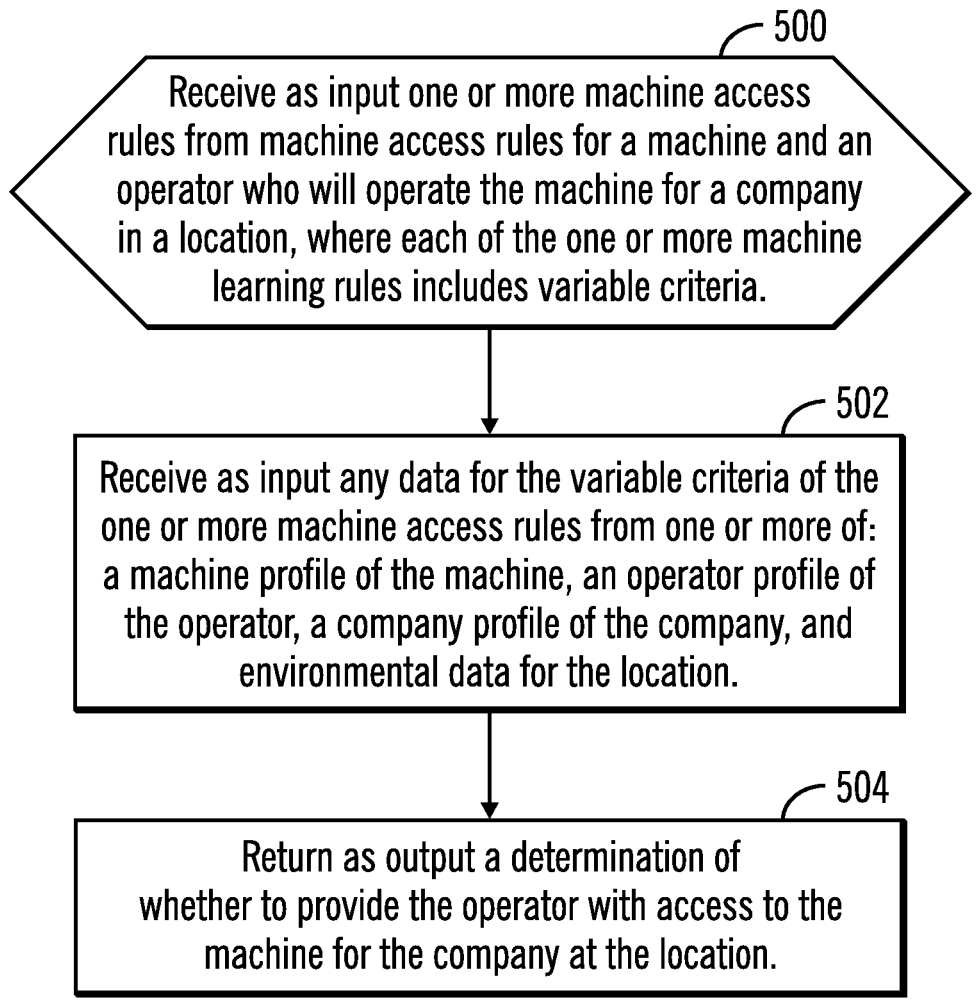
FIG. 5 illustrates, in a flow chart, operations for making a determination of access using a machine learning model in accordance with certain embodiments.

FIG. 5 illustrates, in a flow chart, operations for making a determination of access using a machine learning model 142 in accordance with certain embodiments. With embodiments, either the machine access system 110 or a machine access client 160*a* . . . 160*n* invokes the machine learning model 142 to perform the operations of blocks 500-504 after identifying one or more machine access rules and obtaining the data (blocks 400-402). In block 500, the machine learning model 142 receives as input one or more machine access rules from machine access rules for a particular machine 150*a* . . . 150*n* and a particular operator who will operate the machine 150*a* . . . 150*n* for a company in a location, where each of the one or more machine access rules includes variable criteria. In block 502, the machine learning model 142 receives as input any data for the variable criteria of the one or more machine access rules from one or more of: a machine profile 132 of the machine, an operator profile 134 of the operator, a company profile 136 of the company, and environmental data 138 for the location. In block 504, the machine learning model 142 outputs a determination of whether to provide the operator with access to the machine 150*a* . . . 150*n* for the company at the location. The machine learning model 142 may be described as applying the data to the variable criteria of the one or more machine access rules to determine whether to provide the operator with access to the machine at the location.

In certain embodiments, machine learning components of the machine learning model 142 are trained and that training produces one or more models that may then be evaluated with new data to generate a desired output. Thus, the machine learning module 142 applies the data to the one or more trained models to generate the output.

In certain embodiments, when the operator decides to use a machine 150a . . . 150n, the machine access client 160a . . . 160n first obtains the identity of the operator. Then, the machine access client 160a . . . 160n queries the machine access system 110 for an operator profile 138. Additionally, on that query, the machine access client 160a . . . 160n checks for calibration being up to date, and other factors, geolocation (e.g., is the machine located in an authorized area), etc.

For example, an operator may have different levels of certification for a given machine 150a . . . 150n, meaning the operator may perform a subset of operations with that machine 150a . . . 150n. For example, in a combine harvester machine, "Operator A" may have sufficient privileges to maneuver the machine in the worksite, but not have privileges to implement controls for harvesting.

As another example, where a Computerized Tomography (CT) scan (Cat scan) operator is fully certified to operate a CT scan machine in one state, that operator may not legally operate the CT scan machine in another state. With embodiments, the machine access system 110 or the machine access client 160a . . . 160n may be configured to analyze the operator identity, the operator's certification details (in the operator profile 134), and the geolocation of the a CT scan machine, and, based on the analysis, disable the function of the a CT scan machine when the a CT scan machine is located in the second state.

In certain embodiments, the machine access client 160a . . . 160n of the machine 150a . . . 150n is an Electronic Control Unit (ECU) capable of acquiring the operator identity. The operator identity may be acquired via a password in a keypad, fingerprint sensor, facial recognition or another mechanism. With embodiments, each user has a Unique User Identifier (UUID) or each group of uses share a UUID.

In certain embodiments, the ECU connects to the computing device 100, which is a cloud server and is able to perform queries based on UUIDs and Machine Identifiers (MIDs).

In certain embodiments, the machine will have one or more ECUs that enable operation of machine features (e.g. for a vehicle that would be: engine, transmission, etc.). Those features may be individually allowed or denied. For example: for an operator in a certain certification level, the operator may operate machine up to 50% capacity.

In certain embodiments, one or more certification authorities are able to issue and revoke certifications of training to the computing device 100 using the UUID. Certification may contain information about where the certification is valid (geofence), expiration date, and a list of operations which operator is allowed to perform. This information may be stored in the operator profile 134.

In certain embodiments, one or more machine maintenance, calibration, and inspection authorities are able to issue and revoke certificates of compliance to the computing device 100 using the EID. These may have expiration dates and restrictions based on machine operating conditions. Such information may be stored in the machine profile 13. For example, if the machine 150a . . . 150n was serviced for operation in cold environments and oil X was used, and now the machine 150a . . . 150n was moved to a hot climate, where oil Y should be used, access to operate the machine 150a . . . 150n in the hot climate may be denied until the environmental conditions for operation are met (e.g., changing the oil from X to Y).

In certain embodiments, the company (e.g., a worksite owner or contracting party) may have additional machine access rules that are configured in the computing device 100 against a given EID. For example, there may be schedule based access control, where machine X, may not be utilized in geofence area Y until machine Z completes work. Such information may be stored in the company profile 135.

In certain embodiments, computing device 100 is a cloud server that uses blockchain and a smart contract to enforce identity of participants, and the machine access rules defined for machine (asset) operation. In one example model (leveraging Hyperledger® Composer modeling constraints), the participants are: operator, machine owner, jobsite owner (contracting party), maintenance/calibration authorities, certificate/licensing authorities. (Hyperledger is a registered trademark of the Linux Foundation in the United States and/or other countries.)

In certain embodiments, the machines 150a . . . 150n are assets. Transactions are the issuing and revoking of certificates and restrictions against an asset. Transaction and ledger visibility may be defined by an access control list.

Embodiments address the problem of scale, where variable criteria of multiple operators, machines (e.g., fleets of vehicles), companies (e.g., owners), and certification/licensing authorities may be taken into account when determining whether to authorize an operator to operate a particular machine 150a . . . 150n.

Embodiments provide the capability to leverage certification systems (e.g. licensed crane operator) to determine what, if any, fine grained controls should be allowed on the machine 150a . . . 150n. Embodiments allow certification systems to obtain data from the operation of the machine 150a . . . 150n (e.g. a pilot completed x number of hours of flying as a copilot). Embodiments allow integration of maintenance systems (e.g. the crane has been calibrated within the required number of usage hours to continue operation).

Certain embodiments enable controlling operation of a machine 150a . . . 150n by determining a prospective operator of the machine 150a . . . 150n, determining whether the prospective operator has proper privileges to use the machine 150a . . . 150n, determining whether the conditions for use of the machine 150a . . . 150n are proper, and determining whether timing conditions for use of the machinery are proper.

Figure 6:
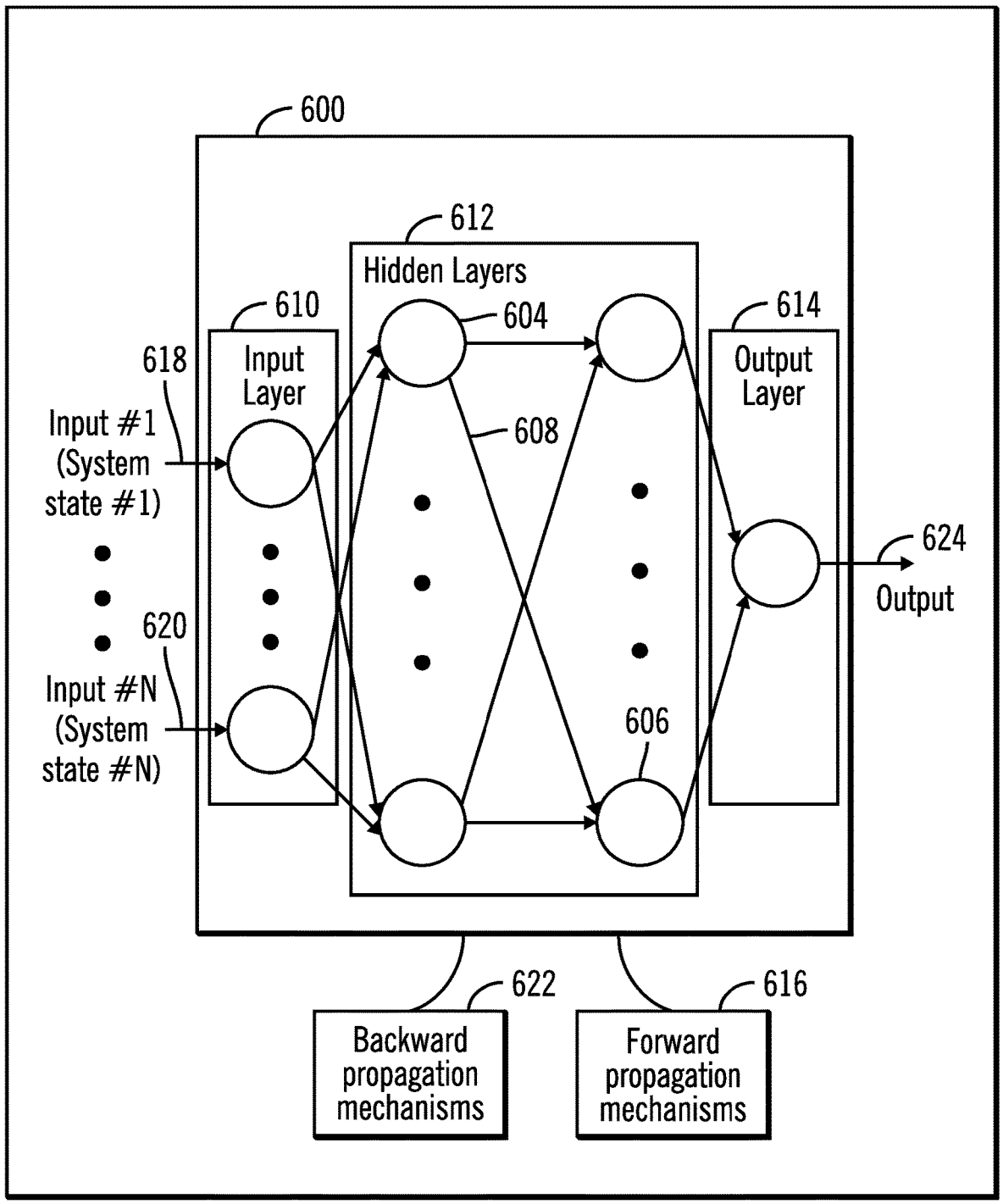
FIG. 6 illustrates, in a block diagram, details of a machine learning module in accordance with certain embodiments.

FIG. 6 illustrates, in a block diagram, details of a machine learning module 600 in accordance with certain embodiments. In certain embodiments, the machine learning module 142 is implemented using the components of the machine learning module 600.

The machine learning module 600 may comprise a neural network with a collection of nodes with links connecting them, where the links are referred to as connections. For example, FIG. 6 shows a node 604 connected by a connection 608 to the node 606. The collection of nodes may be organized into three main parts: an input layer 610, one or more hidden layers 612, and an output layer 614.

The connection between one node and another is represented by a number called a weight, where the weight may be either positive (if one node excites another) or negative (if one node suppresses or inhibits another). Training the machine learning module 600 entails calibrating the weights in the machine learning module 600 via mechanisms referred to as forward propagation 616 and backward propagation 622. Bias nodes that are not connected to any previous layer may also be maintained in the machine learning module 600. A bias may be described as an extra input of 1 with a weight attached to it for a node.

In certain embodiments, the input data 618 . . . 620 are examples of inputs 240, and output 624 is an example of output 624.

In forward propagation 616, a set of weights are applied to the input data 618 . . . 320 to calculate the output 624. For the first forward propagation, the set of weights may be selected randomly or set by, for example, a system administrator. That is, in the forward propagation 616, embodiments apply a set of weights to the input data 618 . . . 620 and calculate an output 624.

In backward propagation 622 a measurement is made for a margin of error of the output 624, and the weights are adjusted to decrease the error. Backward propagation 622 compares the output that the machine learning module 600 produces with the output that the machine learning module 600 was meant to produce, and uses the difference between them to modify the weights of the connections between the nodes of the machine learning module 600, starting from the output layer 614 through the hidden layers 612 to the input layer 610, i.e., going backward in the machine learning module 600. In time, backward propagation 622 causes the machine learning module 600 to learn, reducing the difference between actual and intended output to the point where the two come very close or coincide.

The machine learning module 600 may be trained using backward propagation to adjust weights at nodes in a hidden layer to produce adjusted output values based on the provided inputs 240. A margin of error may be determined with respect to the actual output 624 from the machine learning module 224 and an expected output to train the machine learning module 600 to produce the desired output value based on a calculated expected output. In backward propagation, the margin of error of the output may be measured and the weights at nodes in the hidden layers 612 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 600 is configured to repeat both forward and backward propagation until the weights of the machine learning module 600 are calibrated to accurately predict an output.

The machine learning module 600 implements a machine learning technique such as decision tree learning, association rule learning, artificial neural network, inductive programming logic, support vector machines, Bayesian models, etc., to determine the output value 624.

In certain machine learning module 600 implementations, weights in a hidden layer of nodes may be assigned to these inputs to indicate their predictive quality in relation to other of the inputs based on training to reach the output value 624 (e.g., alert or recommendation).

With embodiments, the machine learning module 600 is a neural network, which may be described as a collection of "neurons" with "synapses" connecting them.

With embodiments, there may be multiple hidden layers 612, with the term "deep" learning implying multiple hidden layers. Hidden layers 612 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 616 and the backward propagation 622.

In backward propagation 622, embodiments measure the margin of error of the output and adjust the weights accordingly to decrease the error.

Neural networks repeat both forward and backward propagation until the weights are calibrated to accurately predict the output 624.

In certain embodiments, the inputs to the machine learning module 600 are machine access rules and data, and the output of the machine learning module 600 is a determination of whether to allow an operator to access a machine 150a . . . 150n.

Figure 7:
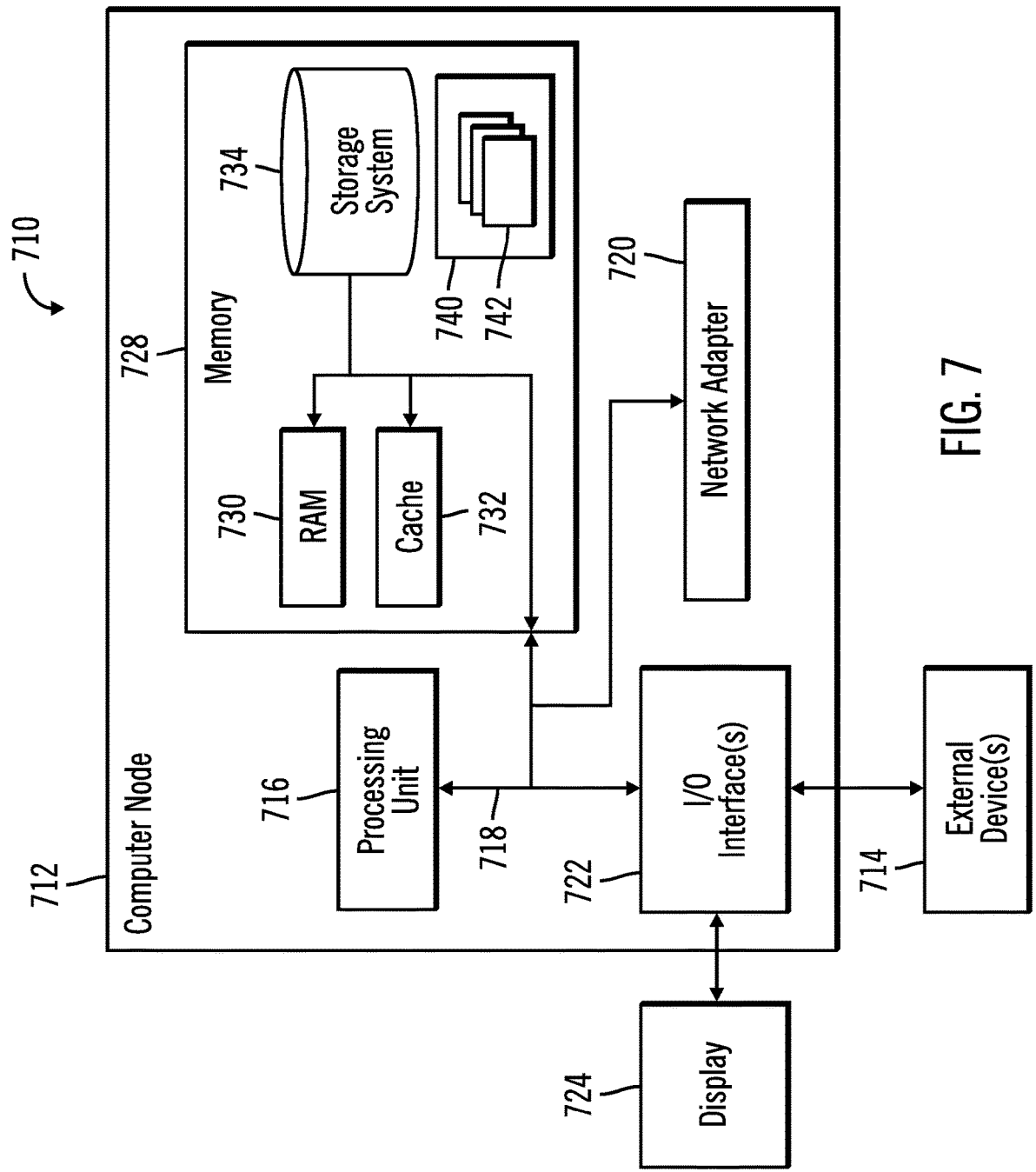
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the computing device 100 and each machine 160a . . . 160n includes the components of computer node 712. In certain embodiments, the computing device 100 and the data stores 130, 140 are part of a cloud infrastructure. In certain alternative embodiments, the computing device 100 and the data stores 130, 140 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
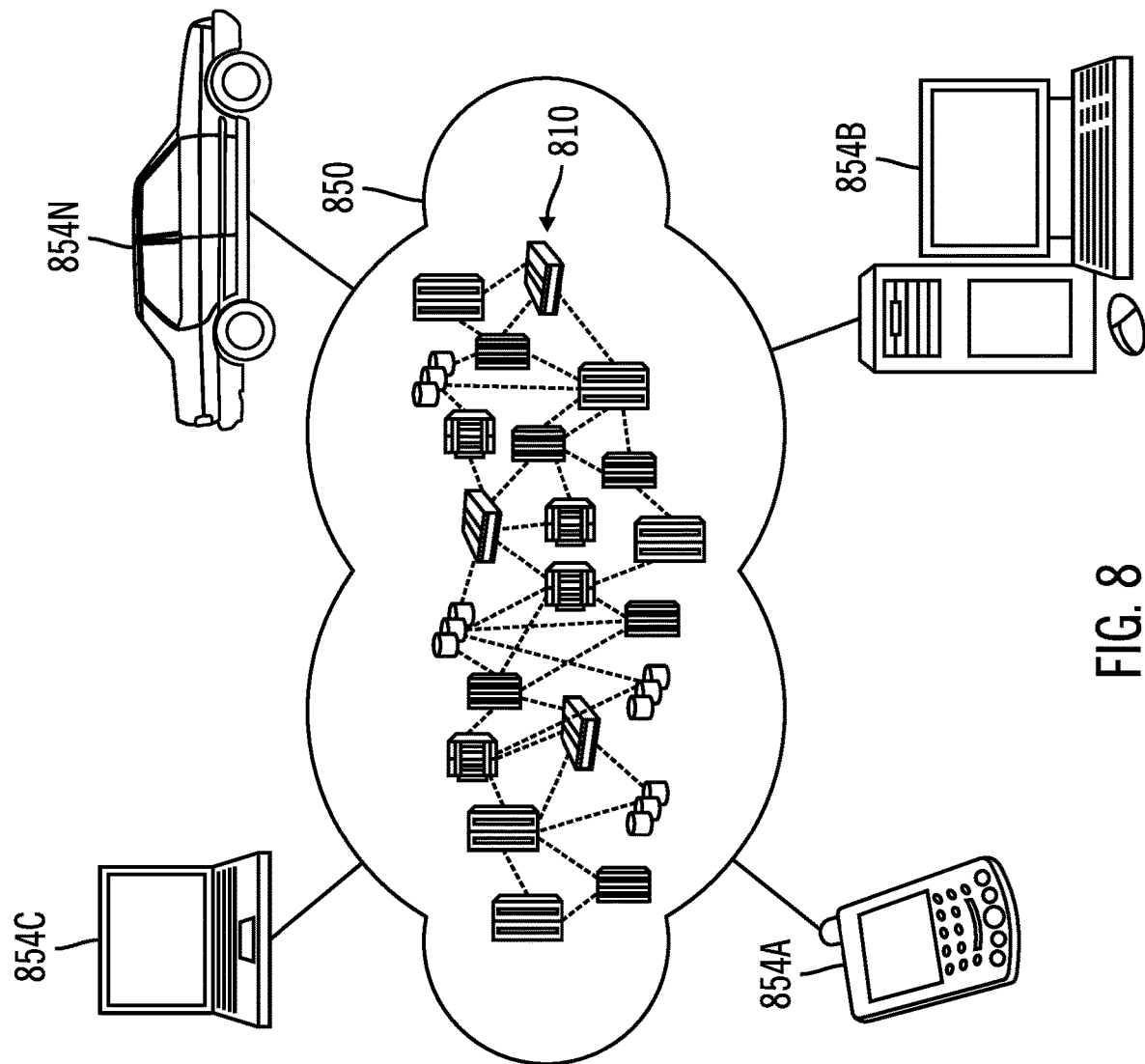
FIG. 8 illustrates a cloud computing environment in accordance with certain embodiments.

Referring now to FIG. 8, illustrative cloud computing environment 820 is depicted. As shown, cloud computing environment 820 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 820 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 820 can communicate with any type of computerized device over any type of network and/or network addressable connection (e.g., using a web browser).

Figure 9:
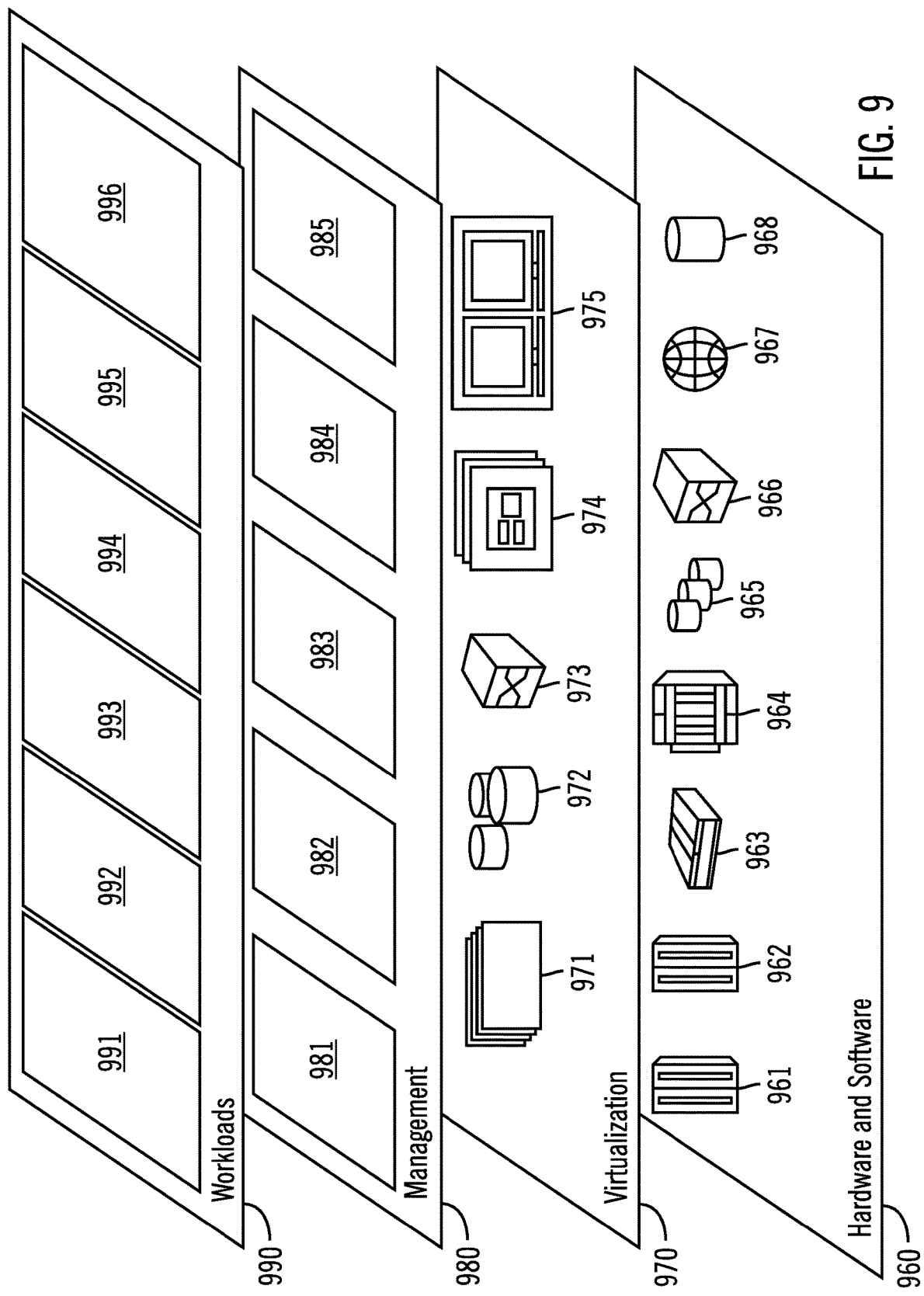
FIG. 9 illustrates abstraction model layers in accordance with certain embodiments.

Referring now to FIG. 9, a set of functional abstraction layers provided by cloud computing environment 820 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and network managed rules for machine access.

Thus, in certain embodiments, software or a program, implementing network managed rules for machine access in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   receiving, from an operator, a request to access a machine;
   identifying one or more machine access rules for the machine and the operator who will operate the machine for a company in a location, wherein each of the one or more machine access rules includes variable criteria;
   obtaining data for the variable criteria of the one or more machine access rules from: a machine profile of the machine that indicates a condition of the machine, an operator profile of the operator that indicates permissions and experience of the operator, a company profile of the company that indicates requirements of the company, and environmental data for the location that indicates weather;
   applying the data to the variable criteria of the one or more machine access rules to determine whether to provide the operator with access to the machine at the location; and
   providing an indication of whether the operator has access to the machine at the location.

2. The computer-implemented method of claim 1, wherein a computing device of a cloud infrastructure includes a machine access system and global machine access rules, and wherein the machine access system identifies the one or more machine access rules from the global machine access rules that include the variable criteria, obtains the data for the variable criteria, and applies the data to the variable criteria of the one or more machine access rules to make the determination of whether to provide the operator with access to the machine at the location.

3. The computer-implemented method of claim 1, wherein the machine includes a machine access client and local access rules, and wherein the machine access client identifies the one or more machine access rules from the local access rules that include the variable criteria, obtains the data for the variable criteria, and applies the data to the variable criteria of the one or more machine access rules to make the determination of whether to provide the operator with access to the machine at the location.

4. The computer-implemented method of claim 1, wherein the indication indicates that the operator is one of: denied access to the machine, granted full access to the machine, and granted partial access to the machine to perform a subset of functions available on the machine.

5. The computer-implemented method of claim 1, wherein applying the data to the variable criteria of the one or more machine access rules is performed by a machine learning model.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:
   receiving, from an operator, a request to access a machine;
   identifying one or more machine access rules for the machine and the operator who will operate the machine for a company in a location, wherein each of the one or more machine access rules includes variable criteria;
   obtaining data for the variable criteria of the one or more machine access rules from: a machine profile of the machine that indicates a condition of the machine, an operator profile of the operator that indicates permissions and experience of the operator, a company profile of the company that indicates requirements of the company, and environmental data for the location that indicates weather;
   applying the data to the variable criteria of the one or more machine access rules to determine whether to provide the operator with access to the machine at the location; and
   providing an indication of whether the operator has access to the machine at the location.

8. The computer program product of claim 7, wherein a computing device of a cloud infrastructure includes a machine access system and global machine access rules, and wherein the machine access system identifies the one or more machine access rules from the global machine access rules that include the variable criteria, obtains the data for the variable criteria, and applies the data to the variable criteria of the one or more machine access rules to make the determination of whether to provide the operator with access to the machine at the location.

9. The computer program product of claim 7, wherein the machine includes a machine access client and local access rules, and wherein the machine access client identifies the one or more machine access rules from the local access rules that include the variable criteria, obtains the data for the variable criteria, and applies the data to the variable criteria of the one or more machine access rules to make the determination of whether to provide the operator with access to the machine at the location.

10. The computer program product of claim 7, wherein the indication indicates that the operator is one of: denied access to the machine, granted full access to the machine, and granted partial access to the machine to perform a subset of functions available on the machine.

11. The computer program product of claim 7, wherein applying the data to the variable criteria of the one or more machine access rules is performed by a machine learning model.

12. The computer program product of claim 7, wherein a Software as a Service (SaaS) is configured to perform the operations of the computer program product.

13. A computer system, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more computer-readable memories, to perform operations comprising:
- receiving, from an operator, a request to access a machine;
- identifying one or more machine access rules for the machine and the operator who will operate the machine for a company in a location, wherein each of the one or more machine access rules includes variable criteria;
- obtaining data for the variable criteria of the one or more machine access rules from: a machine profile of the machine that indicates a condition of the machine, an operator profile of the operator that indicates permissions and experience of the operator, a company profile of the company that indicates requirements of the company, and environmental data for the location that indicates weather;
- applying the data to the variable criteria of the one or more machine access rules to determine whether to provide the operator with access to the machine at the location; and
- providing an indication of whether the operator has access to the machine at the location.

14. The computer system of claim 13, wherein a computing device of a cloud infrastructure includes a machine access system and global machine access rules, and wherein the machine access system identifies the one or more machine access rules from the global machine access rules that include the variable criteria, obtains the data for the variable criteria, and applies the data to the variable criteria of the one or more machine access rules to make the determination of whether to provide the operator with access to the machine at the location.

15. The computer system of claim 13, wherein the machine includes a machine access client and local access rules, and wherein the machine access client identifies the one or more machine access rules from the local access rules that include the variable criteria, obtains the data for the variable criteria, and applies the data to the variable criteria of the one or more machine access rules to make the determination of whether to provide the operator with access to the machine at the location.

16. The computer system of claim 13, wherein the indication indicates that the operator is one of: denied access to the machine, granted full access to the machine, and granted partial access to the machine to perform a subset of functions available on the machine.

17. The computer system of claim 13, wherein applying the data to the variable criteria of the one or more machine access rules is performed by a machine learning model.

18. The computer system of claim 13, wherein a Software as a Service (SaaS) is configured to perform the operations of the computer system.

* * * * *